United States Patent
Pan et al.

(10) Patent No.: US 11,872,676 B2
(45) Date of Patent: Jan. 16, 2024

(54) EXTRACTION DEVICE FOR HEATING TRACER

(71) Applicant: HUBEI XIANTING TECHNOLOGY CO., LTD., Jingzhou (CN)

(72) Inventors: Chuanhong Pan, Jingzhou (CN); Yu Huang, Wuhan (CN); Yong Xiang, Jingzhou (CN); Zuqiang Xin, Jingzhou (CN); Jianhua Liu, Jingzhou (CN)

(73) Assignee: HUBEI XIANTING TECHNOLOGY CO., LTD., Jingzhou (CN)

( * ) Notice: Subject to any disclaimer, the term of this patent is extended or adjusted under 35 U.S.C. 154(b) by 75 days.

(21) Appl. No.: 17/734,048

(22) Filed: Apr. 30, 2022

(65) Prior Publication Data
US 2022/0258316 A1    Aug. 18, 2022

(30) Foreign Application Priority Data

May 21, 2021 (CN) .......................... 202110555620.1
Mar. 31, 2022 (CN) .......................... 202220738459.1

(51) Int. Cl.
*B23P 11/00* (2006.01)
*B25B 27/14* (2006.01)
*F16L 55/00* (2006.01)

(52) U.S. Cl.
CPC .............. *B25B 27/14* (2013.01); *F16L 55/00* (2013.01); *B23P 11/00* (2013.01)

(58) Field of Classification Search
CPC ....... B23P 11/00; B23P 11/027; B23P 19/027; B23P 19/02; B23P 19/04; B23P 19/10
USPC ........... 29/255, 252, 278, 70; 269/43, 45, 32
See application file for complete search history.

(56) References Cited

U.S. PATENT DOCUMENTS

| 4,320,575 A * | 3/1982 | Karlsson ................. C11C 5/021 29/241 |
| 5,086,836 A | 2/1992 | Barth et al. |
| 5,966,795 A * | 10/1999 | Pagano .................. G03B 21/64 40/709 |
| 2004/0025329 A1* | 2/2004 | Belt .......................... G09F 5/04 29/700 |
| 2013/0061443 A1* | 3/2013 | Fengler ............ H01B 13/01209 29/700 |

(Continued)

FOREIGN PATENT DOCUMENTS

| CN | 103223651 A | 7/2013 |
| CN | 212338552 U | 1/2021 |

*Primary Examiner* — Sarang Afzali
*Assistant Examiner* — Darrell C Ford

(57) ABSTRACT

An extraction device for a heating tracer includes a clamping assembly and a driving member. The clamping assembly includes a connecting seat, a first extrusion wheel and a second extrusion wheel rotatably arranged on the connecting seat. The first extrusion wheel and the second extrusion wheel are both an eccentric wheel. In use, the heating tracer is clamped between the first extrusion wheel and the second extrusion wheel, and is in contact with an outer circumference of the first extrusion wheel and the second extrusion wheel. The driving member includes a main body and a drive shaft arranged thereon. The main body is configured to drive the drive shaft to extend along an axial direction of the main body. The drive shaft is connected to an end of the connecting seat away from the first extrusion wheel and the second extrusion wheel.

10 Claims, 9 Drawing Sheets

(56) References Cited

U.S. PATENT DOCUMENTS

2015/0246718 A1\* 9/2015 Aitken .................. B29C 70/222
29/700

\* cited by examiner

EXTRACTION DEVICE FOR HEATING TRACER

CROSS-REFERENCE TO RELATED APPLICATIONS

This application claims the benefit of priority from Chinese Patent Application Nos. 202220738459.1 and 202110555620.1, respectively filed on Mar. 31, 2022 and May 21, 2021. The content of the aforementioned application, including any intervening amendments thereto, is incorporated herein by reference in its entirety.

TECHNICAL FIELD

This application relates to petroleum and chemical transportation, and more specifically to an extraction device for a heating tracer.

BACKGROUND

Arranging a heating tracer in delivery pipelines has become indispensable for the heat preservation or anti-freezing in the petroleum and chemical production. Specifically, heat is radiated from the heating tracer via a heat tracing medium to compensate for the heat loss of other pipelines through direct or indirect heat exchange, so as to achieve the heating, heat preservation or anti-freezing.

Currently, the heating tracer and the pipelines requiring heat tracing are both wrapped by a thermal insulation layer to enhance the thermal insulation effect. When a damaged heating tracer needs to be removed, it is necessary to remove the insulation layer outside the heating tracer first, leading to cumbersome operation. Moreover, the separated insulation layer is damaged and cannot be reused.

SUMMARY

In order to solve the problems, a main purpose of the present disclosure is to provide an extraction device for a heating tracer, by which the heating tracer can be conveniently detached.

Technical solutions of this application are specifically described below.

This application provides an extraction device for a heating tracer, comprising:
  a clamping assembly; and
  a driving member;
  wherein the clamping assembly comprises a connecting seat, a first extrusion wheel and a second extrusion wheel; the first extrusion wheel and the second extrusion wheel are rotatably arranged on the connecting seat; the first extrusion wheel and the second extrusion wheel are both an eccentric wheel; and the first extrusion wheel and the second extrusion wheel are configured to clamp the heating tracer;
  the driving member comprises a main body and a drive shaft; the drive shaft is arranged on the main body; the main body is configured to drive the drive shaft to extend and retract along an axial direction of the main body; the drive shaft is connected to an end of the connecting seat away from the first extrusion wheel and the second extrusion wheel; when the drive shaft is driven by the main body to extend along the axial direction of the main body, the connecting seat is allowed to drive the first extrusion wheel and the second extrusion wheel to move along the axial direction of the main body; and at the same time, the first extrusion wheel and the second extrusion wheel rub against the heating tracer to rotate eccentrically to reduce a gap between the first extrusion wheel and the second extrusion wheel, so as to clamp the heating tracer and drive the heating tracer to move synchronously along the axial direction of the main body to extract the heating tracer.

In an embodiment, an outer circumference of the first extrusion wheel is provided with a first anti-skid tooth, and/or an outer circumference of the second extrusion wheel is provided with a second anti-skid tooth.

In an embodiment, the first extrusion wheel is fixedly provided with a first gear; the second extrusion wheel is fixedly provided with a second gear; and the first gear and the second gear are engaged with each other.

In an embodiment, the clamping assembly further comprises an elastic part; one end of the elastic part is connected to the first extrusion wheel, and the other end of the elastic part is connected to the second extrusion wheel; and the elastic part is configured to apply an elastic preload force to the first extrusion wheel and the second extrusion wheel to maintain the first extrusion wheel and the second extrusion wheel in an initial state.

In an embodiment, the driving member has a hollow structure; the heating tracer is configured to pass through the main body and the drive shaft in sequence; an end of the main body away from the clamping assembly is provided with a centering member; the centering member is rotatable and is provided with an arc surface fitting an outer circumferential surface of the heating tracer; and the centering member is configured to support and stabilize the heating tracer.

In an embodiment, the extraction device further comprises a guide assembly; and the guide assembly is configured to guide the drive shaft to extend and retract along the axial direction of the main body.

In an embodiment, the guide assembly comprises a guide rod and a sleeve; the sleeve is fixedly connected with the main body; the guide rod is configured to pass through the sleeve; an axis of the sleeve is parallel to an axis of the main body; the guide rod is fixedly connected with the drive shaft; the guide rod is configured to move along an axial direction of the sleeve; and when the drive shaft is driven by the main body to extend out along the axial direction of the main body, the clamping assembly is allowed to drive the heating tracer and the guide rod to move synchronously along the axial direction of the main body to extract the heating tracer.

In an embodiment, the extraction device further comprises a sensing assembly; the sensing assembly is electrically connected to the driving member; and the sensing assembly is configured to transmit a control signal to the main body when sensing that the guide rod moves to a preset position, so as to control the drive shaft to switch between extension and retraction.

In an embodiment, the sensing assembly comprises a first sensor and a second sensor arranged spaced apart; the preset position comprises a first preset position and a second preset position; the control signal comprises a first control signal and a second signal; the first sensor is configured to transmit the first control signal to the main body when sensing that the guide rod moves to the first preset position, so as to control the drive shaft to switch from an extended state to a retracted state; and the second sensor is configured to transmit the second control signal to the main body when sensing that the guide rod moves to the second preset position, so as to control the drive shaft to switch from the retracted state to the extended state.

In an embodiment, a distance between the first sensor and the second sensor is adjustable.

Compared to the prior art, the present disclosure has the following beneficial effects.

When the damaged heating tracer needs to be removed, the drive shaft is driven to extend out along the axial direction of the main body to allow the clamping assembly to drive the heating tracer to move synchronously along the axial direction of the main body, so as to directly extract the heating tracer from the inside of an insulation layer. By means of the device provided herein, it is not necessary to remove the insulation layer outside the heating tracer, greatly simplifying the removal process of the heating tracer Furthermore, the insulation layer can be continuously used, saving the costs. In the prior art, the heating tracer is usually clamped by a hydraulic actuator, which has a complex structure, high manufacturing cost and large energy consumption. By comparison, the clamping assembly of the present disclosure is a mechanical structure, which has a simpler structure and lower cost, and does not need an additional element to provide clamping force.

BRIEF DESCRIPTION OF THE DRAWINGS

In order to explain the technical solutions of the embodiments of the present disclosure more clearly, the drawings that need to be used in the embodiments will be briefly described below. It should be understood that presented in the drawings are only some embodiments of the present disclosure, which are not intend to limit the scope of the disclosure. It should be noted that other drawings obtained by those of ordinary skill in the art from these drawings without paying creative effort should still fall within the scope of the disclosure.

Figure 1:
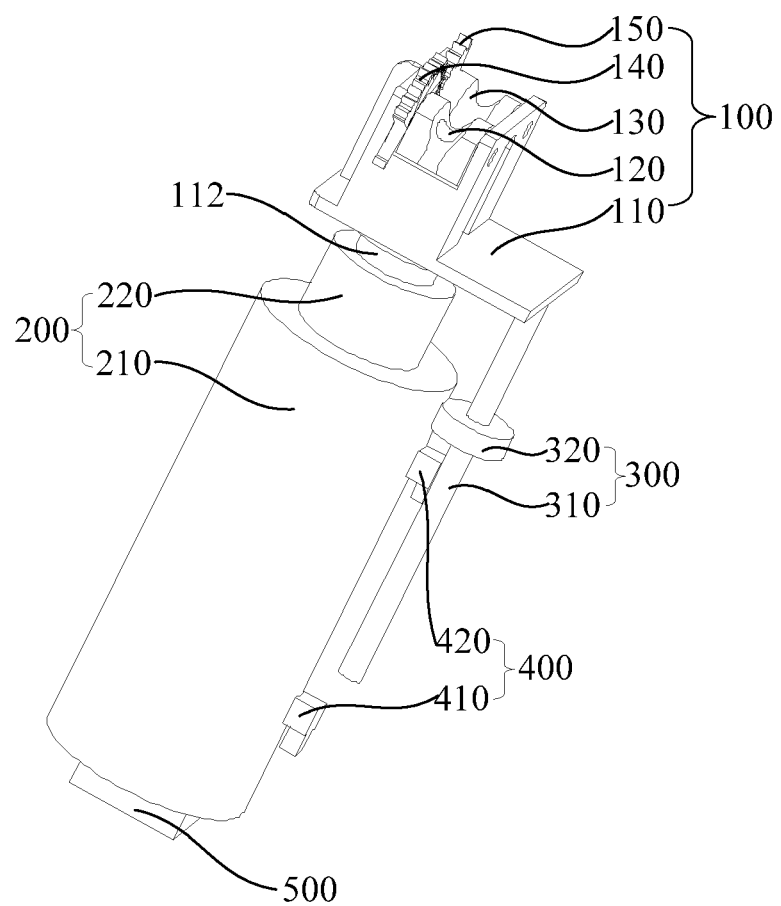
FIG. 1 is a schematic diagram of a structure of an extraction device for a heating tracer according to an embodiment of the present disclosure.

In the drawings: 100, clamping assembly; 110, connecting seat; 111, first through hole; 112, connecting piece; 1121, second through hole; 1122, external thread; 113, bottom plate; 114, first side plate; 115, second side plate; 116, third side plate; 117, fourth side plate; 120, first extrusion wheel; 121, first anti-skid tooth; 122, first fixing hole; 123, first eccentric hole; 124, first positioning screw; 125, first end; 126, second end; 130, second extrusion wheel; 131, second anti-skid tooth; 132, third fixing hole; 133, second eccentric hole; 134, second positioning screw; 135, third end; 136, fourth end; 140, first gear; 141, second fixing hole; 142, first connecting hole; 150, second gear; 151, fourth fixing hole; 152, second connecting hole; 160, elastic part; 170, third fixing component; 180, fourth fixing component; 200, driving member; 210, main body; 220, drive shaft; 221, internal thread; 300, guide assembly; 310, guide rod; 320, sleeve; 400, sensing assembly; 410, first sensor; 420, second sensor; 500, centering member; and 1, heating tracer.

The disclosure will be described below with reference to the drawings to make the objects, features and advantages of the disclosure clearer.

DETAILED DESCRIPTION OF EMBODIMENTS

The technical solutions of the present disclosure will be described completely and clearly below with reference to the accompanying drawings and embodiments. Obviously, provided below are merely some embodiments of the disclosure, which are not intended to limit the disclosure. It should be understood that all other embodiments obtained by those skilled in the art based on the content disclosed herein without paying any creative effort shall fall within the scope of the present disclosure.

It should be noted that as used herein, all directional indications (such as up, down, left, right, front and back) are only used to explain the relative position and movement of various components under a specific posture (as shown in the accompanying drawings). If the specific posture changes, the directional indication also changes accordingly. In addition, the descriptions involving "first", "second", etc. in the present disclosure are only for the purpose of description, and should not be understood as indicating or implying their relative importance or implicitly indicating the number of indicated technical features. Thus, a feature delimited with "first", "second" may expressly or implicitly include at least one of that feature. In addition, as used herein, the "and/or" includes three solutions, for example, the "A and/or B" includes the solution A, the solution B, and a combination thereof. In addition, the technical solutions of various embodiments can be combined with each other on the premise that the combined technical solution can be implemented by a person of ordinary skill in the art.

Figure 2:
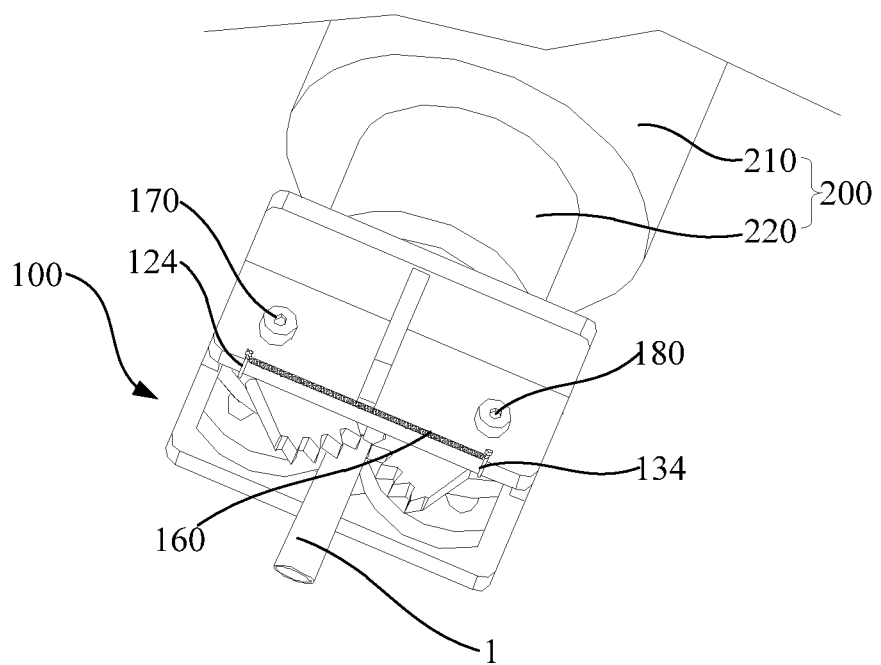
FIG. 2 is another schematic diagram of the structure of the extraction device according to an embodiment of the present disclosure.

As shown in FIGS. 1-2, an extraction device for a heating tracer is provided, which includes a clamping assembly 100 and a driving member 200. The clamping assembly 100 includes a connecting seat 110, a first extrusion wheel 120 and a second extrusion wheel 130. The first extrusion wheel 120 and the second extrusion wheel 130 are rotatably arranged on the connecting seat 110. The first extrusion wheel 120 and the second extrusion wheel 130 are both an eccentric wheel. The first extrusion wheel 120 and the second extrusion wheel 130 are configured to clamp the heating tracer 1. The driving member 200 includes a main body 210 and a drive shaft 220. The drive shaft 220 is arranged on the main body 210. The main body 210 is configured to drive the drive shaft 220 to extend and retract along an axial direction of the main body 210. The drive shaft 220 is connected to an end of the connecting seat 110 away from the first extrusion wheel 120 and the second extrusion wheel 130. When the drive shaft 220 is driven by the main body 210 to extend along the axial direction of the main body 210, the connecting seat 110 is allowed to drive the first extrusion wheel 120 and the second extrusion wheel 130 to move along the axial direction of the main body 210. At the same time, the first extrusion wheel 120 and the second extrusion wheel 130 rub against the heating tracer 1 to rotate eccentrically to reduce a gap between the first extrusion wheel 120 and the second extrusion wheel 130, so as to clamp the heating tracer 1 and drive the heating tracer 1 to move synchronously along the axial direction of the main body 210 to extract the heating tracer 1.

When the damaged heating tracer 1 needs to be removed, the drive shaft 220 is driven to extend out along the axial direction of the main body 210 to allow the clamping assembly 100 to drive the heating tracer 1 to move synchronously along the axial direction of the main body 210, so as to directly extract the heating tracer 1 from the inside of an insulation layer. By means of the device provided herein, it is not necessary to remove the insulation layer outside the heating tracer 1, greatly simplifying the removal process of the heating tracer 1. Furthermore, the insulation layer can be continuously used, saving the costs. In the prior art, the heating tracer 1 is usually clamped by a hydraulic actuator, which has a complex structure, high manufacturing cost and large energy consumption. By comparison, the clamping assembly 100 of the present disclosure is a mechanical structure, which has a simpler structure and lower cost, and does not need an additional element to provide clamping force.

In an embodiment, the extraction device is configured to extract the heating tracer 1 wrapped by the insulation layer.

In an actual operation, a small part of the insulation layer can be cut by hydraulic pliers or hydraulic shears, so that the heating tracer 1 can be directly clamped by the clamping assembly 100 of the extraction device, and then the heating tracer 1 that needs to be removed is directly extracted from the insulation layer by the extraction device. A new heating tracer 1 is replaced according to the demand. Finally, the small part of the sheared insulation layer can be wrapped with a new insulation layer. Since the sheared insulation layer is smaller than the overall insulation layer, a lot of insulation layer materials are saved. Specifically, the new heating tracer 1 can be sent into the insulation layer through the extraction device when arranging the new heating tracer 1.

In an embodiment, when the first extrusion wheel 120 and the second extrusion wheel 130 rotate eccentrically around the retracting direction of the drive shaft 220, the gap between the first extrusion wheel 120 and the second extrusion wheel 130 is reduced to tightly clamp the heating tracer 1. When the first extrusion wheel 120 and the second extrusion wheel 130 rotate eccentrically around the extending direction of the drive shaft 220, the gap between the first extrusion wheel 120 and the second extrusion wheel 130 is increased to release the clamping of the heating tracer 1. When the main body 210 drives the drive shaft 220 to extend along the axial direction of the main body 210, the first extrusion wheel 120 and the second extrusion wheel 130 rub against the heating tracer 1 and rotate eccentrically around the retracting direction of the drive shaft 220 to reduce the gap between the first extrusion wheel 120 and the second extrusion wheel 130 to clamp the heating tracer 1, so as to gradually extract the heating tracer 1 from the insulation layer. When the main body 210 drives the drive shaft 220 to retract along the axial direction of the main body 210, the first extrusion wheel 120 and the second extrusion wheel 130 rub against the heating tracer 1 and rotate eccentrically around the extending direction of the drive shaft 220, so as to increase the gap between the first extrusion wheel 120 and the second extrusion wheel 130 to release the clamping of the heating tracer 1, so that the heating tracer 1 will not be driven by the first extrusion wheel 120 and the second extrusion wheel 130. If the heating tracer 1 has been completely extracted from the inside of the insulation layer at this time, it indicates that the removal of the heating tracer 1 is completed (the complete extraction of the heating tracer 1 from the insulation layer means that after the drive shaft 220 is retracted along the axial direction of the main body 210, the first extrusion wheel 120 and the second extrusion wheel 130 do not clamp the heating tracer 1, that is, the heating tracer 1 has been separated from the extraction device). If the heating tracer 1 has not been completely extracted from the insulation layer, after the first extrusion wheel 120 and the second extrusion wheel 130 are driven by the drive shaft 220 to retract, the main body 210 drives the drive shaft 220 to extend along the axial direction of the main body 210 to make the first extrusion wheel 120 and the second extrusion wheel 130 clamp the heating tracer 1 again to re-extract the heating tracer 1 until the heating tracer 1 is completely extracted from the inside of the insulation layer.

Figure 3:
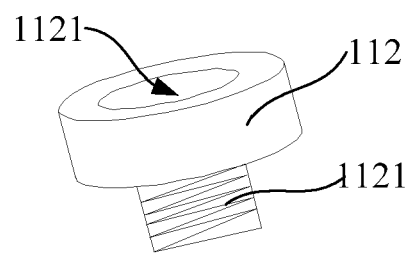
FIG. 3 schematically illustrates a structure of a connecting piece according to an embodiment of the present disclosure.
Figure 4:
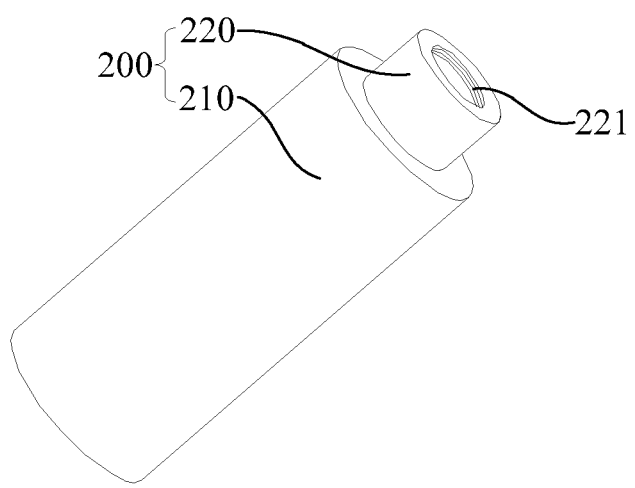
FIG. 4 schematically illustrates a structure of a driving member according to an embodiment of the present disclosure.

Referring to FIGS. 1 and 3-4, an end of the connecting seat 110 away from the first extrusion wheel 120 and the second extrusion wheel 130 is provided with a connecting piece 112. An end of the connecting piece 112 away from the connecting seat 110 is provided with an external thread 1122. The drive shaft 220 of the driving member 200 is provided with an internal thread 221. The connecting piece 112 is screwed with the internal thread 221 of the drive shaft 220 through the external thread 1122 to connect the drive shaft 220 and the connecting seat 110.

Figure 5:
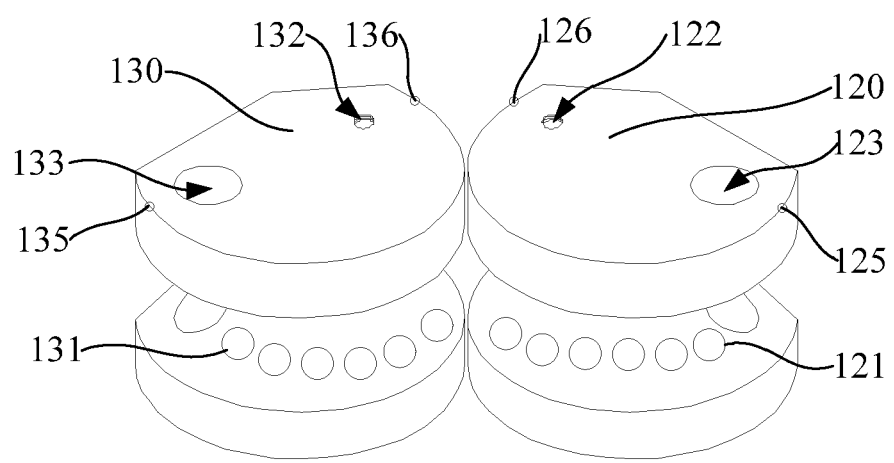
FIG. 5 schematically depicts a structure of a first extrusion wheel and a second extrusion wheel according to an embodiment of the present disclosure.

Referring to FIG. 5, an outer circumference of the first extrusion wheel 120 is provided with a first anti-skid tooth 121, and/or an outer circumference of the second extrusion wheel 130 is provided with a second anti-skid tooth 131. The first anti-skid tooth 121 and/or the second anti-skid tooth 131 can increase the friction between the first extrusion wheel 120 and/or the second extrusion wheel 130 and the heating tracer 1 to avoid a slippage between the first extrusion wheel 120 and/or the second extrusion wheel 130 and the heating tracer 1, so as to clamp the heating tracer 1 more reliably. In this embodiment, the outer circumference of the first extrusion wheel 120 is provided with the first anti-skid tooth 121, and the outer circumference of the second extrusion wheel 130 is provided with the second anti-skid tooth 131.

Referring to FIG. 1, the first extrusion wheel 120 is fixedly provided with a first gear 140. The second extrusion wheel 130 is fixedly provided with a second gear 150. The first gear 140 and the second gear 150 are engaged with each other. Specifically, the arrangement of the first gear 140 and the second gear 150 enables the first extrusion wheel 120 and the second extrusion wheel 130 to rotate eccentrically more reliably, so as to clamp or release the heating tracer through the first extrusion wheel 120 and the second extrusion wheel 130 more reliably. Specifically, when the main body 210 drives the drive shaft 220 to extend along the axial direction of the main body 210, the first gear 140 and the second gear 140 are engaged to ensure that the first extrusion wheel 120 and the second extrusion wheel 130 rub against the heating tracer 1 and rotate eccentrically around the retracting direction of the drive shaft 220, so as to avoid that at least one of the first extrusion wheel 120 and the second extrusion wheel 130 rotates eccentrically around the extending direction of the drive shaft 220, so as to avoid uncontrollable variation of the gap between the first extrusion wheel 120 and the second extrusion wheel 130, so as to avoid that the first extrusion wheel 120 and the second extrusion wheel 130 cannot clamp the heating tracer 1.

Referring to FIGS. 4-5, the first extrusion wheel 120 is provided with a first fixing hole 122. The first gear 140 is provided with a second fixing hole 141. The clamping assembly 100 further includes a first fixing component. The first fixing component passes through the first fixing hole 122 and the second fixing hole 141 in sequence, so as to fix the first gear 140 relative to the first extrusion wheel 120. In other embodiments, the number of the first fixing components is multiple. The multiple first fixing components make the fixing of the first gear 140 relative to the first extrusion wheel 120 more reliable.

Referring to FIGS. 4-5, the second extrusion wheel 130 is provided with a third fixing hole 132. The second gear 150 is provided with a fourth fixing hole 151. The clamping assembly 100 further includes a second fixing component. The second fixing component passes through the third fixing hole 132 and the fourth fixing hole 151 in sequence, so as to fix the second gear 150 relative to the second extrusion wheel 130. In other embodiments, the number of the second fixing components is multiple. The multiple second fixing components make the fixing of the second gear 150 relative to the second extrusion wheel 130 more reliable.

Referring to an embodiment shown in FIGS. 2 and 4-5, the first extrusion wheel 120 is provided with a first eccentric hole 123. The first gear 140 is provided with a first connecting hole 142. The clamping assembly 100 includes a third fixing component 170. The third fixing component 170 passes through the connecting seat 110, the first eccentric hole 123 and the first connecting hole 142 in sequence, and the first extrusion wheel 120 and the first gear 140 can rotate around the third fixing component 170, so as to rotatably connect the first extrusion wheel 120 and the first gear 140 relative to the connecting seat 110. Specifically, the third fixing component 170 may be, but not limited to, a bolt.

Referring to an embodiment shown in FIGS. 2 and 4-5, the second extrusion wheel 130 is provided with a second eccentric hole 133. The second gear 150 is provided with a second connecting hole 152. The clamping assembly 100 includes a fourth fixing component 180. The fourth fixing component 180 passes through the connecting seat 110, the second eccentric hole 133 and the second connecting hole 152 in sequence, and the second extrusion wheel 130 and the second gear 150 can rotate around the fourth fixing component 180 to rotatably connect the second extrusion wheel 130 and the second gear 150 relative to the connecting seat 110. Specifically, the fourth fixing component 180 may be, but not limited to, a bolt.

Referring to an embodiment shown in FIGS. 4-5, the first gear 140 and the second gear 150 both have a sector-shaped structure, and the first gear 140 and the second gear 150 both have triangular teeth.

Figure 9:
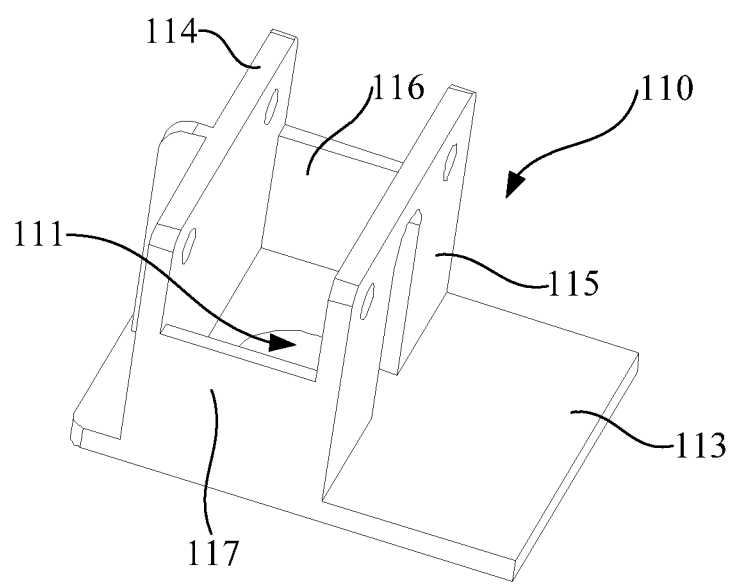
FIG. 9 is a schematic diagram of a structure of the connecting seat according to an embodiment of the present disclosure.

Referring to an embodiment shown in FIGS. 1 and 9, the connection seat 110 includes a bottom plate 113, a first side plate 114 and a second side plate 115. The first side plate 114 and the second side plate 115 are arranged on the bottom plate 113 and opposite to each other. The drive shaft 220 is configured to connect an end of the bottom plate 113 away from the first side plate 114 and the second side plate 115. The first extrusion wheel 120 is arranged at an end of the first side plate 114 facing the second side plate 115, and the second extrusion wheel 130 is arranged at an end of the second side plate 115 facing the first side plate 114. Specifically, the bottom plate 113 is configured to connect the drive shaft 220 through the connecting piece 112, and a first through hole 111 is opened on the bottom plate 113.

Referring to an embodiment shown in FIGS. 2 and 9, the third fixing component 170 passes through the first side plate 114, the first eccentric hole 123, the first connecting hole 142 and the second side plate 115 in sequence, so as to connect the first extrusion wheel 120 to the first side plate 114 and connect the first gear 140 to the second side plate 115. The fourth fixing component 180 passes through the first side plate 114, the second eccentric hole 133, the second connecting hole 152 and the second side plate 115 in sequence, so as to connect the second extrusion wheel 130 and the second gear 150 to the second side plate 115.

Referring to an embodiment shown in FIGS. 1 and 9, the connecting seat 110 further includes a third side plate 116 and a fourth side plate 117. The third side plate 116 and the fourth side plate 117 are arranged opposite to each other. One end of the third side plate 116 is connected to the first side plate 114, and the other end of the third side plate 116 is connected to the second side plate 115. One end of the fourth side plate 117 is connected to the first side plate 114, and the other end of the fourth side plate 117 is connected to the second side plate 115.

Referring to an embodiment shown in FIGS. 1 and 5, the first extrusion wheel 120 and the second extrusion wheel 130 have the same structure, and a distance between the first eccentric hole 123 and the second eccentric hole 133 is greater than a diameter of the first extrusion wheel 120. An end of the outer circumference of the first extrusion wheel 120 closest to the first eccentric hole 123 is a first end 125; and the other end of the outer circumference of the first extrusion wheel 120 farthest from the first eccentric hole 123 is a second end 126. An end of the outer circumference of the second extrusion wheel 130 closest to the second eccentric hole 133 is a third end 135, and the other end of the outer circumference of the second extrusion wheel 130 farthest from the second eccentric hole 133 is a fourth end 136. When the first end 125 of the first extrusion wheel 120 and the third end 135 of the second extrusion wheel 130 are in contact with the heating tracer 1 respectively, the first extrusion wheel 120 and the second extrusion wheel 130 do not clamp the heating tracer 1. When the second end 126 of the first extrusion wheel 120 and the fourth end 136 of the second extrusion wheel 130 are in contact with the heating tracer 1, the first extrusion wheel 120 and the second extrusion wheel 130 clamp the heating tracer 1.

Specifically, when the main body 210 drives the drive shaft 220 to extend along the axial direction of the main body 210, the first extrusion wheel 120 and the second extrusion wheel 130 rub against the heating tracer 1 and rotate eccentrically around the retracting direction of the drive shaft 220, so that the first extrusion wheel 120 gradually rotates from the first end 125 in contact with the heating tracer 1 to the second end 126 in contact with the heating tracer 1, and the second extrusion wheel 130 gradually rotates from the third end 135 in contact with the heating tracer 1 to the fourth end 136 in contact with the heating tracer 1, so that the gap between the first extrusion wheel 120 and the second extrusion wheel 130 is gradually reduced, thereby clamping the heating tracer 1. When the main body 210 drives the drive shaft 220 to retract along the axial direction of the main body 210, the first extrusion wheel 120 and the second extrusion wheel 130 rub against the heating tracer 1 and rotate eccentrically around the extending direction of the drive shaft 220, so that the first extrusion wheel 120 gradually rotates from the second end 126 in contact with the heating tracer 1 to the first end 125 in contact with the heating tracer 1, and the second extrusion wheel 130 gradually rotates from the fourth end 136 in contact with the heating tracer 1 to the third end 135 in contact with the heating tracer 1, so that the gap between the first extrusion wheel 120 and the second extrusion wheel 130 is increased, thereby releasing the clamping of the heating tracer 1.

In an embodiment, the clamping assembly 100 further comprises an elastic part 160. One end of the elastic part 160 is connected to the first extrusion wheel 120, and the other end of the elastic part 160 is connected to the second extrusion wheel 130. The elastic part 160 is configured to apply an elastic preload force to the first extrusion wheel 120 and the second extrusion wheel 130 to maintain the first extrusion wheel 120 and the second extrusion wheel 130 in an initial state.

Specifically, when the extraction device is not in operation, the elastic part 160 applies tension to the first extrusion wheel 120 and the second extrusion wheel 130 respectively to make the first extrusion wheel 120 and the second extrusion wheel 130 approach to each other, so as to maintain the first extrusion wheel 120 and the second extrusion wheel 130 in the initial state with the smallest gap. When the heating tracer 1 gradually approaches and abuts against the first extrusion wheel 120 and the second extrusion wheel 130 along the extending direction of the drive shaft 220, the first extrusion wheel 120 and the second extrusion wheel 130 rotate eccentrically around the extending direction of the drive shaft 220 to increase the gap between the first extrusion wheel 120 and the second extrusion wheel 130. The heating tracer 1 gradually extends between the first extrusion wheel 120 and the second extrusion wheel 130, and then the elastic part 160 applies elastic preload force to the first extrusion wheel 120 and the second extrusion wheel 130 to make the first extrusion wheel 120 and the second extrusion wheel 130 rotate eccentrically around the retracting direction of the drive shaft 220, so as to reduce the gap between the first extrusion wheel 120 and the second extrusion wheel 130, thereby clamping the heating tracer 1.

Referring to an embodiment shown in FIG. 2, the first extrusion wheel 120 is provided with a first positioning screw 124, and the second extrusion wheel 130 is provided with a second positioning screw 134. One end of the elastic part 160 is connected with the first positioning screw 124, and the other end of the elastic part 160 is connected with the second positioning screw 134.

Figure 6:
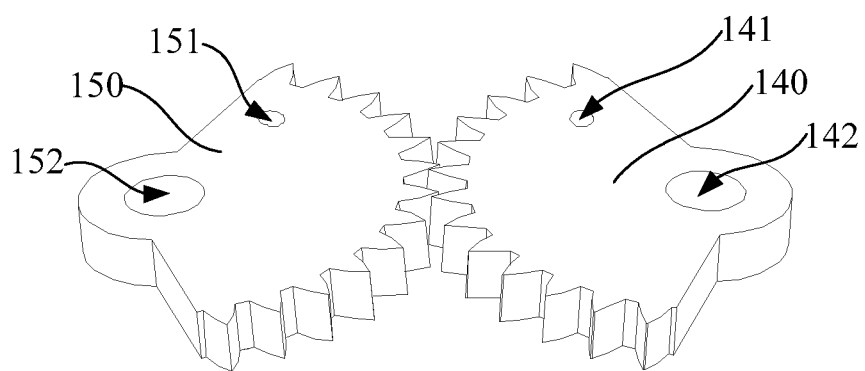
FIG. 6 schematically shows a structure of a first gear and a second gear according to an embodiment of the present disclosure.

Referring to an embodiment shown in FIGS. 1 and 6, the driving member 200 has a hollow structure. The heating tracer 1 is configured to pass through the main body 210 and the drive shaft 220 in sequence. An end of the main body 210 away from the clamping assembly 100 is provided with a centering member 500. The centering member 500 is rotatable, and is provided with an arc surface fitting an outer circumferential surface of the heating tracer 1. The centering member 500 is configured to support and stabilize the heating tracer 1. Specifically, the heating tracer 1 is supported by the centering member 500, so as to avoid the friction between the heating tracer 1 and an inner wall of the driving member 200 as much as possible to make the extraction much easier.

The driving member 200 is a hollow hydraulic jack. The drive shaft 220 is a jacking cylinder of the hollow hydraulic jack. The guide assembly 300 is configured to prevent the drive shaft 220 from rotating around the axis of the driving member 200. Specifically, a sleeve 320 is fixedly connected to the main body 210. A guide rod 310 is fixedly connected with the drive shaft 220. The guide rod 310 is configured to pass through the sleeve 320, and cannot be deflected relative to the sleeve 320, so that the drive shaft 220 cannot be deflected relative to the main body 210. Therefore, the guide assembly 300 is also configured to prevent the jacking cylinder from rotating during the operation of the hollow hydraulic jack, so that the jacking cylinder drives the connecting seat 110 or the clamping assembly 100 to deflect. The arrangement of the guide assembly 300 makes the extension and retraction of the jacking cylinder more stable and reliable.

In this embodiment, the heating tracer 1 extends into the driving member 200 from an end of the driving member 200 away from the clamping assembly 100, and extends out of the driving member 200 from an end of the driving member 200 close to the clamping assembly 100. During operation, the heating tracer 1 passing through the driving member 200 gradually approaches and abuts against the first extrusion wheel 120 and the second extrusion wheel 130 along the extending direction of the drive shaft 220 to make the first extrusion wheel 120 and the second extrusion wheel 130 rotate eccentrically around the extending direction of the drive shaft 220, so as to increase the gap between the first extrusion wheel 120 and the second extrusion wheel 130. The heating tracer 1 gradually extends between the first extrusion wheel 120 and the second extrusion wheel 130, and then under an action of the elastic part 160, the first extrusion wheel 120 and the second extrusion wheel 130 can pre-clamp the heating tracer 1.

Figure 7:
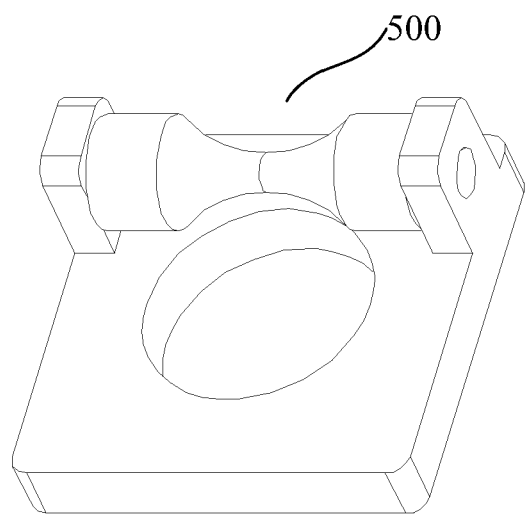
FIG. 7 is a schematic diagram of a structure of a centering member according to an embodiment of the present disclosure.
Figure 8:
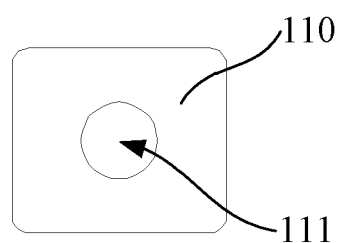
FIG. 8 is a top view of a connecting seat according to an embodiment of the present disclosure.

Referring to an embodiment shown in FIGS. 1, 3 and 7, the connecting seat 110 is provided with a first through hole 111. The connecting piece 112 is provided with a second through hole 1121. The heating tracer 1 passes through the main body 210, the drive shaft 220, the second through hole 1121 of the connecting piece 112 and the first through hole 111 of the connecting seat 110 in sequence and is located between the first extrusion wheel 120 and the second extrusion wheel 130.

Referring to an embodiment shown in FIG. 1, the extraction device further includes the guide assembly 300, and the guide assembly 300 is configured to guide the drive shaft 220 to extend and retract along the axial direction of the main body 210, so as to prevent the drive shaft 220 from deviating from a predetermined direction, thereby preventing the heating tracer 1 from deviating from the predetermined direction to make the removal process of the heating tracer 1 more reliable.

Referring to an embodiment shown in FIG. 1, the guide assembly 300 includes the guide rod 310 and the sleeve 320. The sleeve 320 is fixedly connected with the main body 210. The guide rod 310 passes through the sleeve 320, and the axis of the sleeve 320 is parallel to the axis of the main body 210. The guide rod 310 is fixedly connected with the drive shaft 220. The guide rod 310 is configured to move along the axial direction of the sleeve 320. When the drive shaft 220 is driven by the main body 210 to extend out along the axial direction of the main body 210, the clamping assembly 100 is allowed to drive the heating tracer 1 and the guide rod 310 to move synchronously along the axial direction of the main body 210, so as to extract the heating tracer 1. In this embodiment, the guide rod 310 is fixedly connected with the connecting seat 110, so as to fix the guide rod 310 relative to the driving shaft 220 through the connecting seat 110.

Referring to an embodiment shown in FIG. 1, the extraction device further includes a sensing assembly 400. The sensing assembly 400 is electrically connected with the driving member 200. The sensing assembly 400 is configured to transmit a control signal to the main body 210 when sensing that the guide rod 310 moves to a preset position, so as to control the drive shaft 220 to switch between extension and retraction. Specifically, the sensing assembly 400 in the present disclosure can control the movement stroke of the drive shaft 220, that is, the sensing assembly 400 in the present disclosure can control the movement stroke of the heating tracer 1.

Referring to an embodiment shown in FIG. 1, the sensing assembly 400 includes a first sensor 410 and a second sensor 420. The first sensor 410 and the second sensor 420 are arranged spaced apart. The preset position includes a first preset position and a second preset position. The control signal comprises a first control signal and a second signal. The first sensor 410 is configured to transmit the first control signal to the main body 210 when sensing that the guide rod 310 moves to the first preset position, so as to control the drive shaft 220 to switch from an extended state to a retracted state. The second sensor 420 is configured to transmit the second control signal to the main body 210 when sensing that the guide rod 310 moves to the second preset position, so as to control the drive shaft 220 to switch from the retracted state to the extended state. Specifically, a distance between the first preset position and the second preset position is the movement stroke of the drive shaft 220.

In an embodiment, the distance between the first sensor 410 and the second sensor 420 can be adjusted, so that the moving stroke of the drive shaft 220 can be adjusted. Specifically, the distance between the first sensor 410 and the second sensor 420 can be adjusted adaptively according to a length of the heating tracer 1 or other requirements.

Referring to an embodiment shown in FIG. 1, the sensing assembly 400 is arranged on the main body 210 of the driving member 200. Specifically, the first sensor 410 and the second sensor 420 are arranged on the main body 210 of the driving member 200 at intervals. In other embodiments, the sensing assembly 400 is arranged on an external structure, as long as it can sense that the guide rod 310 moves to the preset position, and transmit the control signal to the main body 210.

In an embodiment, when the extraction device is working, the extraction device can be fixed on a conveying pipe by a fixing structure, and the fixing structure can be, but not limited to, a fixing strap.

Described above are only preferred embodiments of the present disclosure and are not intended to limit the present disclosure. It should be understood that any modifications, replacements and improvements made by those skilled in the art without departing from the spirit and scope of the present disclosure should fall within the scope of the present disclosure defined by the appended claims.

What is claimed is:

1. An extraction device for a heating tracer, the extraction device comprising:
   a clamping assembly; and
   a driving member;
   wherein the clamping assembly comprises a connecting seat, a first extrusion wheel and a second extrusion wheel; the first extrusion wheel and the second extrusion wheel are rotatably arranged on the connecting seat; the first extrusion wheel and the second extrusion wheel are both an eccentric wheel; and the first extrusion wheel and the second extrusion wheel are configured to clamp the heating tracer;
   the driving member comprises a main body and a drive shaft; the drive shaft is arranged on the main body; the main body is configured to drive the drive shaft to extend and retract along an axial direction of the main body; the drive shaft is connected to an end of the connecting seat away from the first extrusion wheel and the second extrusion wheel; the driving member being configured such that when the drive shaft is driven by the main body to extend along the axial direction of the main body, the connecting seat is allowed to drive the first extrusion wheel and the second extrusion wheel to move along the axial direction of the main body; and at the same time, the first extrusion wheel and the second extrusion wheel rub against the heating tracer to rotate eccentrically to reduce a gap between the first extrusion wheel and the second extrusion wheel, so as to clamp the heating tracer and drive the heating tracer to move synchronously along the axial direction of the main body to extract the heating tracer.

2. The extraction device of claim 1, wherein at least one of an outer circumference of the first extrusion wheel is provided with a first anti-skid tooth, and an outer circumference of the second extrusion wheel is provided with a second anti-skid tooth.

3. The extraction device of claim 1, wherein the first extrusion wheel is fixedly provided with a first gear; the second extrusion wheel is fixedly provided with a second gear; and the first gear and the second gear are engaged with each other.

4. The extraction device of claim 1, wherein the clamping assembly further comprises an elastic part; one end of the elastic part is connected to the first extrusion wheel, and the other end of the elastic part is connected to the second extrusion wheel; and the elastic part is configured to apply an elastic preload force to the first extrusion wheel and the second extrusion wheel to maintain the first extrusion wheel and the second extrusion wheel in an initial state.

5. The extraction device of claim 1, wherein the driving member has a hollow structure; the heating tracer is configured to pass through the main body and the drive shaft in sequence; an end of the main body away from the clamping assembly is provided with a centering member; the centering member is rotatable and is provided with an arc surface fitting an outer circumferential surface of the heating tracer; and the centering member is configured to support and stabilize the heating tracer.

6. The extraction device of claim 1, further comprising:
   a guide assembly;
   wherein the guide assembly is configured to guide the drive shaft to extend and retract along the axial direction of the main body.

7. The extraction device of claim 6, wherein the guide assembly comprises a guide rod and a sleeve; the sleeve is fixedly connected with the main body; the guide rod is configured to pass through the sleeve; an axis of the sleeve is parallel to an axis of the main body; the guide rod is fixedly connected with the drive shaft; the guide rod is configured to move along an axial direction of the sleeve; and when the drive shaft is driven by the main body to extend out along the axial direction of the main body, the clamping assembly is allowed to drive the heating tracer and the guide rod to move synchronously along the axial direction of the main body to extract the heating tracer.

8. The extraction device of claim 1, further comprising:
   a sensing assembly;
   wherein the sensing assembly is electrically connected to the driving member; and the sensing assembly is configured to transmit a control signal to the main body when sensing that the guide rod moves to a preset position, so as to control the drive shaft to switch between extension and retraction.

9. The extraction device of claim 8, wherein the sensing assembly comprises a first sensor and a second sensor arranged spaced apart; the preset position comprises a first preset position and a second preset position; the control signal comprises a first control signal and a second signal; the first sensor is configured to transmit the first control signal to the main body when sensing that the guide rod moves to the first preset position, so as to control the drive shaft to switch from an extended state to a retracted state; and the second sensor is configured to transmit the second control signal to the main body when sensing that the guide rod moves to the second preset position, so as to control the drive shaft to switch from the retracted state to the extended state.

10. The extraction device of claim 9, wherein a distance between the first sensor and the second sensor is adjustable.

\* \* \* \* \*